United States Patent [19]

Snipeliski

[11] 3,742,417
[45] June 26, 1973

[54] THERMAL TRIPPING DEVICES FOR SAFETY INSTALLATIONS AND THE LIKE

[75] Inventor: Jacques Snipeliski, La Tronche, France

[73] Assignee: Cotherm S.A., La Tronche (Isere), France

[22] Filed: Dec. 13, 1971

[21] Appl. No.: 207,299

[30] Foreign Application Priority Data
Mar. 2, 1971 France .............................. 7107584

[52] U.S. Cl. ............. 337/401, 294/83 AE, 337/405
[51] Int. Cl. ............................................. H01h 37/76
[58] Field of Search.................... 337/401, 405, 407, 337/414; 340/232, 227, 227.1; 116/105; 89/1 B; 294/83 AE; 137/67, 72; 200/61.08

[56] References Cited
UNITED STATES PATENTS 3,624,813  11/1971  Gaylord.......................... 244/83 AE
2,530,051  11/1950  Ferguson ........................... 337/405

Primary Examiner—Harold Broome
Attorney—Arthur E. Dowell, Jr.

[57] ABSTRACT

A thermal tripping device for fire protection installations in which an alarm, valve or other appliance is operated by release of a spring biased rod having at one end an eye normally held between two oppositely facing and overlapping hooked or nose shaped parts each formed on an end of two superimposed plate-like arms mounted at their other ends on a common pivot. Each arm has a concave part facing the other to define a free space which contains a bulb which explodes above a predetermined temperature to allow the arms to pivot open and release the rod, but while in an intact state the bulb holds the arms locked together.

4 Claims, 5 Drawing Figures

PATENTED JUN 26 1973    3,742,417

THERMAL TRIPPING DEVICES FOR SAFETY INSTALLATIONS AND THE LIKE

This invention relates to improvements in thermal tripping devices of the kind used in safety installations, particularly for fire protection, wherein operation of the devices actuates appliances in the installations, for example, alarms, sprinkler valves or cocks, fireproof curtains or boards, ventilation shutters or traps, safety doors and the like.

In known tripping devices of this kind, the tripping is controlled by a thermo-sensitive element constituted by an explodable bulb, a bimetallic strip or fusible wire arranged to be destroyed, deformed or divided, when the ambient temperature exceeds a certain limit. In practice, the element is usually disposed to form an abutment for a sliding rod biased by a spring, the free end of the rod being formed to retain a member arranged to operate the appliance, for example, an alarm or so forth. It will be understood that when the ambient temperature rises above the pre-determined threshold, the thermo-sensitive element releases the sliding rod, which is displaced under the spring action thus operating the corresponding appliance.

Experiments have shown that such appliances operate correctly when the force exerted by the member charged with actuating the appliance is relatively small, as is the case, for example, for alarms or for valves or cocks. On the other hand, when the appliances concerned, are fireproof boards or curtains or ventilation shutters which require a considerable force for their operation or retention, it is necessary to connect the sliding rod to an actuating spring which can exert a force which is much stronger than the mechanical resistance offered by the thermo-sensitive element, and this can lead to the damage or destruction of the latter. To avoid this it is necessary to resort to intermediate mechanisms having an electro-magnet or the like, which complicate the assembly and increase the price, at the same time substantially reducing the reliability of operation of the assembly.

An object of the invention is to obviate or reduce the above-mentioned drawback and provide a construction of thermal tripping device capable of efficient and reliable operation whatever force is exerted for actuating the apparatus connected to the device.

According to the invention a thermal tripping device for actuating an apparatus of a safety installation and the like comprises at least one pivoted arm which has a shaped part for co-operating with the moving member for actuating the corresponding apparatus, and said arm being angularly retained by a thermo-sensitive element against the pivoting force which is applied to the arm by the said member.

It will be understood that in such a mechanism, two variable factors enable the adaptation of the mechanical resistance of the thermo-sensitive element to the actuating or retaining force exerted by the moving member of the appliance. One variable is the inclination given to the shaped part of the arm with respect to the axis along which the force is exerted and the other variable is the location of the thermo-sensitive element with respect to the pivot point of the arm, which works like a lever.

In a preferred embodiment of the invention, the device comprises two pivoted arms which, at one end of the device, define two retaining parts or noses adapted to be introduced inside a loop or an eyelet provided at an end of the moving member for actuating the corresponding appliance, inner overlapping edges the said retaining parts being obliquely directed so that traction exerted by the loop parallel to the axis of the arms tends to make the arms pivot open. The thermo-sensitive element is advantageously constituted by an explodable bulb housed in a free space provided between two stamped parts disposed opposite to one another in the arms at a location between a pivot pin for the arms and the retaining parts, in such a manner that once mounted in position, the intact bulb opposes the angular displacement of the arms.

The invention will now be further described, by way of example with reference to the accompanying drawing in which.

Figure 2:
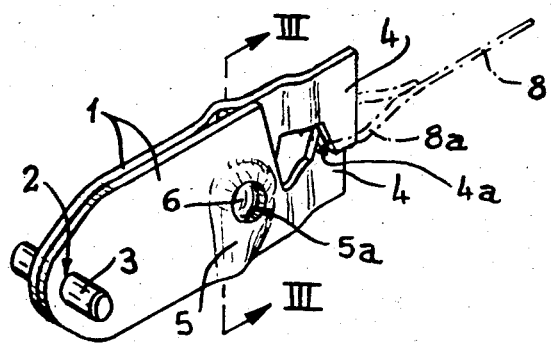
FIG. 2 is a perspective view of the device assembled from the components in FIG. 1.

The tripping device shown, comprises two identical arms 1 formed by the same cutting and shaping tool. Each arm 1 has at one of its ends an aperture 2 for the engagement of a common pivot pin 3. At the opposite end, each of the arms is cut so as to determine a retaining hook-shaped part or nose 4 having an inner edge 4a obliquely directed towards the terminal edge of the nose, the two edges 4a overlapping each other. It will be noted that each nose 4 is laterally offset with respect to the longitudinal axis of the corresponding arm 1, so that once the arms 1 are engaged on the pivot pin 3, the two noses 4 cross and overlap each other in the manner shown in FIG. 2, thus ensuring the retention of the arms along the pin 3.

Figure 1:
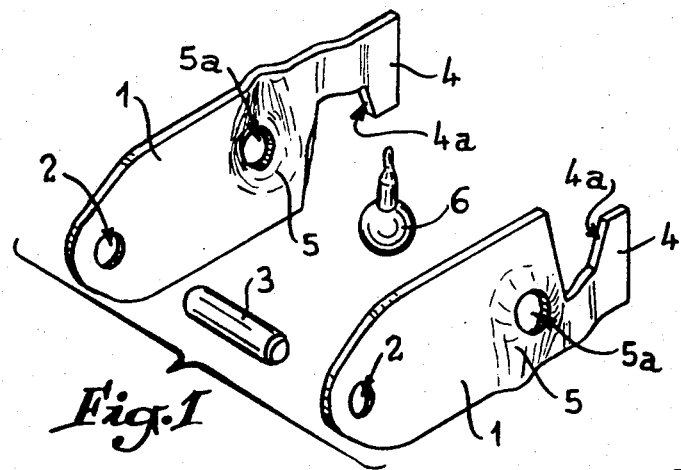
FIG. 1 is an exploded view showing various elements which form a thermal tripping device formed according to the invention.
Figure 3:
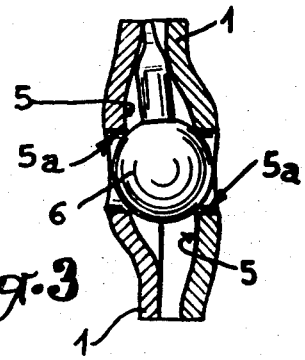
FIG. 3 is a diagrammatic cross sectional view on line III—III in FIG. 2.

Between the aperture 2 and the nose 4, each arm 1 comprises a stamped part 5 in the form of an outwardly shaped relief apertured at 5a. When the arms 1 are mounted on the pin 3 the stamped parts 5 define an inner housing into which is introduced (see FIGS. 1 and 3) an explodable bulb 6 of any suitable known type used in safety installations.

Figure 4:
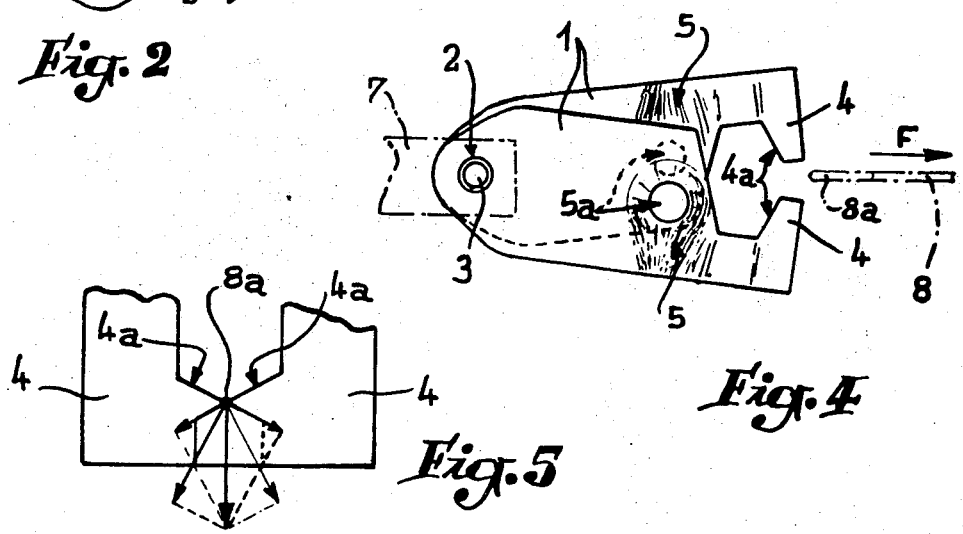
FIG. 4 is a side view illustrating the operation of the device.

In FIG. 4, the pin 3 is shown supported by a fixed support 7 in the shape of a fork, whereas the noses 4 co-operate with a loop 8a provided at the end of a moving member 8 for actuating an appliance, for example an alarm, valve or so forth, connected to the device. The member 8 is biased elastically in the direction of arrow F, i.e., along the longitudinal axis of the arms 1. Because of the inclination of the shaped edges 4a, the biasing force acts to open the arms 1, but the latter are, angularly retained by the extra thickness provided between the arms by the bulb 6. The arms so locked remain stationary and retain the member 8.

When the ambient temperature rises above a certain threshold, the increase in the pressure inside the bulb 6 causes it to explode. The disappearance of the bulb releases the arms 1 which then pivot open about the pin 3, to release the loop 8a and the member 8 to actuate the appliance.

The device can be equipped with a fresh bulb 6 by first dismantling the arms 1 and then reassembling them.

Figure 5:
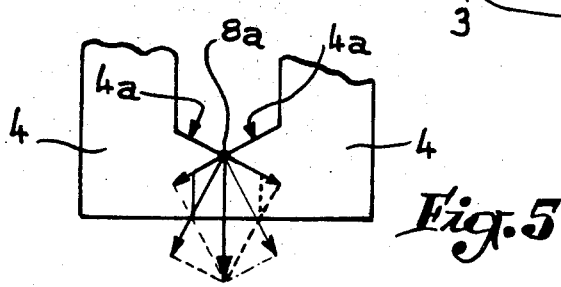
FIG. 5 is a fragmentary side view, on a larger scale, showing the arrangement of the retaining noses.

It will be noted in the first place, that in the above-described device the bulb 6 is in shear, so that it has a mechanical resistance much superior to that presented by the same bulb when it is in compression with a load localized at one point, as in known devices provided with a sliding rod. Moreover, in order to adapt the device to the traction force exerted by the moving member 8, the inclination presented by the inner edges 4a of the retaining noses 4 may be modified. As illustrated in FIG. 5, the most effective component of the resultant of the axial force exerted on the device and bulb 6 by the loop 8a is the component acting perpendicularly to the oblique edge 4a of each nose. For the above-mentioned adaptation the location of the stamped parts 5 between the pin 3 and the noses 4 may also be altered, it being understood that to enable the bulb 6 housed in the stamped parts 5 to support a much greater shearing force, it is important to increase the lever effect by locating the bulb as near as possible to the noses 4.

Naturally, other embodiments of the invention can be devised. In certain cases the bulb 6 may co-operate with extensions of the arms 1 provided beyond the pivot pin 3. Moreover, it should be understood that the bulb can be replaced by any other suitable thermo-sensitive element.

What is claimed is:

1. A thermal tripping device for actuating an appliance of a safety plant and the like by releasing a movable member normally retained by said device, comprising:

a first part formed with a first depression;
a second part formed with a second depression;
pivoting means to pivot said second part to said first part in such manner that said first and second depressions may be situated in front of each other at a first relative position of said second part with respect to said first part;
a thermo-responsive heat-desctructible element housed between said parts in said first and second depressions thereof to normally retain said parts at said first relative position;
and means on at least said second part to retain said movable member when said first and second parts are at said first relative position, with said movable member urging said first and second parts towards a second relative position at which said first and second depressions are no more in front of each other.

2. In a device as claimed in claim 1, said first and second parts being eachin the form of a substantially flat arm, said arms being pivoted to each other in the vicinity of one of their ends, their other end being hook-shaped with the hook-shaped end of one arm being directed oppositely to the hook-shaped end of the other arm, with the hook-shaped ends of said arms overlapping each other at said first relative position to define between said arms an opening in which said movable member is retained, and with the inner edges of said hook-shaped ends of said arms being obliquely directed in such manner that when said thermo-responsive element is destroyed by heat, said movable member may open said arms to be released.

3. In a device as claimed in claim 2, said pivoting means being in the form of a common pivot pin attached to a fixed point.

4. In a device as claimed in claim 1, said thermoresponsive element being formed of an explodable bulb.

* * * * *